United States Patent
Tsapatsis et al.

(10) Patent No.: US 11,311,855 B2
(45) Date of Patent: Apr. 26, 2022

(54) ADSORBENT MATERIAL FOR REMOVAL OF HYDROGEN SULFIDE

(71) Applicants: Regents of the University of Minnesota, Minneapolis, MN (US); Khalifa University of Science and Technology, Abu Dhabi (AE)

(72) Inventors: Michael Tsapatsis, Edina, MN (US); Veerappan Vaithilingam Balasubramanian, Minneapolis, MN (US); Yasser Al Wahedi, Abu Dhabi (AE); Saleh Al Hashimi, Abu Dhabi (AE)

(73) Assignees: Regents of the University of Minnesota, Minneapolis, MN (US); Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 15/768,375

(22) PCT Filed: Oct. 13, 2015

(86) PCT No.: PCT/US2015/055324
§ 371 (c)(1),
(2) Date: Apr. 13, 2018

(87) PCT Pub. No.: WO2017/065749
PCT Pub. Date: Apr. 20, 2017

(65) Prior Publication Data
US 2018/0311642 A1    Nov. 1, 2018

(51) Int. Cl.
*B01J 20/08* (2006.01)
*B01J 20/02* (2006.01)
(Continued)

(52) U.S. Cl.
CPC .............. *B01J 20/08* (2013.01); *B01D 53/52* (2013.01); *B01D 53/82* (2013.01); *B01D 53/96* (2013.01);
(Continued)

(58) Field of Classification Search
CPC ........ B01D 53/52; B01D 53/82; B01D 53/96; B01D 2253/1124; B01D 2257/304;
(Continued)

(56) References Cited

U.S. PATENT DOCUMENTS 3,864,460 A    2/1975  Connell
4,533,529 A    8/1985  Lee
(Continued)

FOREIGN PATENT DOCUMENTS

CN    101098742    1/2008
CN    101367045    2/2009
(Continued)

OTHER PUBLICATIONS

Baird et al., "Cobalt-zinc oxide absorbents for low temperature gas desulfurisation," J. Mater. Chem., 1999, 9(2):599-605.
(Continued)

*Primary Examiner* — Anita Nassiri-Motlagh
(74) *Attorney, Agent, or Firm* — Fish & Richardson P.C.

(57) ABSTRACT

An example method of removing hydrogen sulfide from an input gas includes exposing an adsorbent material to an input gas to obtain an output gas. A concentration of hydrogen sulfide of the output gas is less than a concentration of hydrogen sulfide of the input gas. The adsorbent material includes copper oxide, magnesium oxide, and aluminum oxide. An atomic ratio of copper to magnesium to aluminum of the adsorbent material is X:Y:Z, where X is greater than or equal to 0.6 and less than or equal to 0.9, where Y is greater than or equal to 0 and less than or equal
(Continued)

to 0.2, where Z is greater than or equal to 0 and less than or equal to 0.2, and where X+Y+Z is equal to 1.

11 Claims, 12 Drawing Sheets

(51) Int. Cl.
    *B01J 20/04*     (2006.01)
    *B01D 53/52*     (2006.01)
    *B01D 53/96*     (2006.01)
    *B01J 20/34*     (2006.01)
    *B01J 20/28*     (2006.01)
    *B01D 53/82*     (2006.01)
    *B01J 20/10*     (2006.01)

(52) U.S. Cl.
    CPC ....... *B01J 20/0281* (2013.01); *B01J 20/0285* (2013.01); *B01J 20/041* (2013.01); *B01J 20/103* (2013.01); *B01J 20/2803* (2013.01); *B01J 20/3433* (2013.01); *B01J 20/3458* (2013.01); *B01D 2253/1124* (2013.01); *B01D 2257/304* (2013.01); *B01J 2220/42* (2013.01)

(58) Field of Classification Search
    CPC .... B01J 20/08; B01J 20/0281; B01J 20/0285; B01J 20/041; B01J 20/103; B01J 20/2803; B01J 20/3433; B01J 20/3458
    See application file for complete search history.

(56) References Cited

U.S. PATENT DOCUMENTS

| | | |
|---|---|---|
| 4,797,268 A | 1/1989 | McGovern et al. |
| 4,954,331 A | 9/1990 | Lee et al. |
| 4,985,074 A | 1/1991 | Okada et al. |
| 5,306,685 A | 4/1994 | Khare |
| 2012/0251436 A1 | 10/2012 | Alkhazov |

FOREIGN PATENT DOCUMENTS

| | | |
|---|---|---|
| CN | 102316959 | 1/2012 |
| CN | 103272608 | 9/2013 |
| CN | 104941390 | 9/2015 |
| GB | 1289696 | 9/1972 |
| WO | WO 02/40149 | 5/2002 |
| WO | WO 2010/069851 | 6/2010 |
| WO | WO 2015/073372 | 5/2015 |

OTHER PUBLICATIONS

Belmabkhout et al., "Simultaneous Adsorption of H2S and CO2 on Triamine-Grafted Pore-Expanded Mesoporous MCM-41 Silica," Energy Fuels, Feb. 2011, 25(3):1310-1315.
Bravo-Suárez et al., "Vapor-phase methanol and ethanol coupling reactions on CuMgAl mixed metal oxides," A. Catal. A: General, Mar. 2013, 455:234-246.
Bravo-Suárez, "Ultraviolet-Visible Spectroscopy and Temperature-Programmed Techniques as Tools for Structural Characterization of Cu in CuMgAlOx Mixed Metal Oxides," J. Phys. Chem. C., Aug. 2012, 116(34):18207-18221.
Dhage et al., "Copper-Promoted ZnO/SiO2 Regenerable Sorbents for the Room Temperature Removal of H2S from Reformate Gas Streams," Ind. Eng. Chem. Res., Aug. 2010, 49(18):8388-8396.
Dhage et al., "Reactive adsorption of hydrogen sulfide by promoted sorbents Cu—ZnO/SiO2: active sites by experiment and simulation," Surf. Interface Anal., May 2013, 45(5):865-872.
Elyassi et al., "A high-performance adsorbent for hydrogen sulfide removal," Micropor. Mesopor. Mater., May 2014, 190:152-155.
Eow, "Recovery of sulphur from sour acid gas: A review of the technology," Environmental Progress, Oct. 2002, 21(3):143-162.
Garces et al., "Tunable Shape Microwave Synthesis of Zinc Oxide Nanospheres and Their Desulfurization Performance Compared with Nanorods and Platelet-Like Morphologies for the Removal of Hydrogen Sulfide," J. Phys. Chem. C, Apr. 2012, 116(15):8465-8474.
International Search Report and Written Opinion in International Application No. PCT/US2015/055324 dated Feb. 12, 2016, 20 pages.
Jiang et al.,"Cu—Zn—Al mixed metal oxides derived from hydroxycarbonate precursors for H2S removal at low temperature," Applied Surface Science, Mar. 2010, 256(10):3216-3223.
Jung et al., "H2S removal and the regeneration properties of Zn—Al based sorbents promoted with various promoters," Catal. Today, Feb. 2006, 11(3-4):217-222.
Kang et al., "Effect of Phosphorus Modification on Cu—ZnO—Al2O3 for the Removal of H2S," Energy & Fuels, May 2008, 22:2580-2584.
Kang et al., "Surfactant-assisted synthesis and catalytic activity for SOx abatement of high-surface-area CuMgAlCe mixed oxides," Ceramics International, May 2014, 40(4):5357-5363.
Karayilan et al., "Mn—Cu and Mn—Cu—V Mixed-Oxide Regenerable Sorbents for Hot Gas Desulfurization," Ind. Eng. Chem. Res., Jul. 2005, 44(14):5221-5226.
Khan et al., "Technology Demonstration Journey in ADNOC R&D—A Case Study," Presented at 2018 ADIPEC conference in Abu Dhabi, UAE 2018.
Kumar et al., "H2S adsorption by Ag and Cu ion exchanged faujasites," Micropor. Mesopor. Mater., Dec. 2011,146:127-133.
Montes et al., "Reactive H2S chemisorption on mesoporous silica molecular sieve-supported CuO or ZnO," Micropor. Mesopor. Mater., Mar. 2013, 168:111-120.
Rezaei et al., "Breakthrough performances of metal-exchanged nanotitanate ETS-2 adsorbents for room temperature desulfurization," Chem. Eng. Sci., Feb. 2015, 123:444-449.
Rezaei et al., "Novel Copper-Exchanged Titanosilicate Adsorbent for Low Temperature H2S Removal," Ind. Eng. Chem. Res., Sep. 2012, 51(38):12430-12434.
Rodriguez et al., "Reaction of H2S and S2 with Metal/Oxide Surfaces: Band-Gap Size and Chemical Reactivity," J. Phys. Chem. B., Jul. 1998, 102(28):5511-5519.
Tanasoi et al., "Transition metal-containing mixed oxides catalysts derived from LDH precursors for short-chain hydrocarbons oxidation," A. Catal. A: General, Mar. 2011, 395(1-2):78-86.
Wang et al., "Design of a Sorbent to Enhance Reactive Adsorption of Hydrogen Sulfide," ACS Appl. Mater. Interfaces, Nov. 2014, 6(23):21167-21177.
Wiheeb et al., "Present technologies for hydrogen sulphide removal from gaseous mixtures," Rev. Chem. Eng., Dec. 2013, 29(6):449-470.
Xue et al., "Screening of adsorbents for removal of H2S at room temperature," Green Chem., 2003, 5(5):529-534.
Yasyerli et al., "Dynamic analysis of removal and selective oxidation of H2S to elemental sulfur over Cu—V and Cu—V—Mo mixed oxides in a fixed bed reactor," Chem. Eng. Sci., Oct. 2004, 59(19):4001-4009.
Bae et al., "Effect of Al2O3 content on the adsorptive properties of Cu/ZnO/Al2O3 for removal of odorant sulfur compounds," International journal of hydrogen energy, 34(20):8733-40, Oct. 2009.
EPO Extended Search Report in European Application No. 15906359.3 dated May 9, 2019, 67 pages.
India Office Action in Application No. 201847017254, dated Jul. 15, 2020, 7 pages.

ADSORBENT MATERIAL FOR REMOVAL OF HYDROGEN SULFIDE

This application is a National Stage application under 35 U.S.C. § 371 of International Application No. PCT/US2015/055324, having an International Filing Date of Oct. 13, 2015. This disclosure of the prior application is considered part of (and is incorporated by reference in) the disclosure of this application.

TECHNICAL FIELD

This disclosure relates to re-generable adsorbent materials, and more particularly to a high capacity re-generable adsorbent materials for the removal of hydrogen sulfide.

BACKGROUND

Hydrogen sulfide is a toxic and corrosive gas, and often can be found in sources of natural gas, synthesis gas (i.e., "syngas"), and coal gas, as well as in hydrocarbon feedstocks and sewage treatment plants, among other places.

Due to the potentially deleterious effects of hydrogen sulfide, it is often desirable to remove or separate it from other types of gas. For example, hydrogen sulfide is often removed as a part of industrial processes such as gas processing, gas to liquid processing, Claus processing, coal gasification, and petroleum refining.

In some cases, the removal of hydrogen sulfide from other types of gas is also necessitated by environmental and process requirements. For instance, in some cases, environmental regulations may limit the release of hydrogen sulfide and its oxidation products to the atmosphere.

SUMMARY

Materials for adsorbing elemental sulfur from gases containing hydrogen sulfide are described herein. Implementations of the materials can be used, for example, to remove or otherwise separate hydrogen sulfide gas from other types of gases. In an example application, the adsorbent material can be exposed to an input gas containing hydrogen sulfide gas, such that the adsorbent material adsorbs quantities of sulfur from the input gas. The adsorbent material can be subsequently regenerated, such that some or all of the adsorbed sulfur is removed from the adsorbent material. After regeneration, the adsorbent material can be reused to adsorb additional quantities of sulfur from an input gas. In some cases, the adsorbent material can be regenerated several times, or in some cases, a substantially unlimited number of times.

The adsorbent material has a variety of practical applications. For example, in some cases, the adsorbent material can be used during industrial processes such as gas processing, gas to liquid processing, Claus processing, coal gasification, and petroleum refining to remove or otherwise reduce the presence of hydrogen sulfide in a stream of gas. Further, as implementations of the adsorbent material can be regenerated one or more times, the adsorbent material can be integrated into industrial processes in an efficient and cost effective manner.

In general, in an aspect, a method of removing hydrogen sulfide from an input gas includes exposing an adsorbent material to an input gas to obtain an output gas. A concentration of hydrogen sulfide of the output gas is less than a concentration of hydrogen sulfide of the input gas. The adsorbent material includes copper oxide, magnesium oxide, and aluminum oxide. An atomic ratio of copper to magnesium to aluminum of the adsorbent material is X:Y:Z, where X is greater than or equal to 0.6 and less than or equal to 0.9, where Y is greater than or equal to 0 and less than or equal to 0.2, where Z is greater than or equal to 0 and less than or equal to 0.2, and where X+Y+Z is equal to 1.

Implementations of this aspect can include one or more of the following features.

In some implementations, the method can further include regenerating the adsorbent material after exposing the adsorbent material to the input gas. Regenerating the adsorbent material includes exposing the adsorbent material to an oxidizing gas, and subsequent to exposing the adsorbent material to the oxidizing gas, exposing the adsorbent material to a reducing gas. The input gas can have a first temperature of between approximately 0° C. and 700° C. The oxidizing gas can have a second temperature greater than the first temperature. The oxidizing gas can include $O_2$. The oxidizing gas can contain approximately 5% $O_2$ in $N_2$. The reducing gas can include hydrogen, methane, and/or water. The reducing gas can contain greater than 0% and less than or equal to 10% hydrogen by volume. The reducing gas can contain greater than 0% and less than or equal to 90% methane by volume. The reducing gas can contain greater than 0% and less than or equal to 100% water by volume.

In some implementations, prior to the regeneration, the adsorbent material can have a sulfur adsorption capacity greater than or equal to approximately 2 mmol of sulfur/gram of adsorbent material and less than or equal to approximately 10 mmol of sulfur/gram of adsorbent material. Subsequent to the regeneration, the adsorbent material can have a sulfur adsorption capacity greater than or equal to approximately 1.4 mmol of sulfur/gram of adsorbent material and less than or equal to approximately 10 mmol of sulfur/gram of adsorbent material.

In general, in another aspect, a system for removing hydrogen sulfide from an input gas includes a first conduit between a source of the input gas and an output, and a second conduit between the source of the input gas and the output, the second conduit being different from the first conduit. The further includes first and second portions of an adsorbent material disposed within the first and second conduits, respectively, the adsorbent material including copper oxide, magnesium oxide, and aluminum oxide, An atomic ratio of copper to magnesium to aluminum of the adsorbent material is X:Y:Z, where X is greater than or equal to 0.6 and less than or equal to 0.9, where Y is greater than or equal to 0 and less than or equal to 0.2, where Z is greater than or equal to 0 and less than or equal to 0.2, and where X+Y+Z is equal to 1. The system also includes a valve assembly controlling a flow of input gas from the source to the first and second conduits, the valve assembly being arranged to, in a first configuration, direct the input gas through the first conduit while an oxidizing gas through the second conduit. In a second configuration, the valve assembly can be configured to direct the input gas through the second conduit while directing the oxidizing gas through the first conduit. The system further can further a sensor assembly at an outlet of the first conduit, the sensor assembly being in communication with the valve assembly. The sensor assembly can be programmed to switch the valve assembly from the first configuration to the second configuration when the sensor determines that a concentration of hydrogen sulfide in an output gas at the outlet of the first conduit exceeds a threshold concentration.

In general, in another aspect, a composition includes copper oxide, magnesium oxide, and aluminum oxide. An atomic ratio of copper to magnesium to aluminum of the composition is X:Y:Z, where X is greater than or equal to 0.6 and less than or equal to 0.9, where Y is greater than or equal to 0 and less than or equal to 0.2, where Z is greater than or equal to 0 and less than or equal to 0.2, and where X+Y+Z is equal to 1.

Implementations of this aspect can include one or more of the following features.

In some implementations, the composition can further include a binding agent. The binding agent can include silica. The composition can include approximately 5% to 40% by weight of the binding agent to 40% to 80% by weight, collectively, of copper oxide, magnesium oxide, and aluminum oxide.

In some implementations, a pellet can have a composition as described above.

In some implementations, the composition can further include sulfide or sulfate. An atomic ratio of copper, magnesium, aluminum, and sulfur of the adsorbent material can be X:Y:Z:S, where X is greater than or equal to 0.6 and less than or equal to 0.9, where Y is greater than or equal to 0 and less than or equal to 0.2, where Z is greater than or equal to 0 and less than or equal to 0.2, and where S is greater than 0.

In general, in another aspect, a method of synthesizing an adsorbent material includes heating a solution comprising a copper salt, a magnesium salt, and an aluminum salt, filtering the heated solution to obtain a precipitate, drying the precipitate, and calcining the dried precipitate to provide the adsorbent material.

Implementations of this aspect can include one or more of the following features.

In some implementations, an atomic ratio of copper to magnesium to aluminum of the solution can be X:Y:Z, where X is greater than or equal to 0.6 and less than or equal to 0.9, where Y is greater than or equal to 0 and less than or equal to 0.2, where Z is greater than or equal to 0 and less than or equal to 0.2, and where X+Y+Z is equal to 1.

In some implementations, the copper salt can include copper nitrate.

In some implementations, the magnesium salt can include magnesium nitrate.

In some implementations, the aluminum salt can include aluminum nitrate.

In some implementations, during heating of the solution, a pH of the solution can be maintained from approximately 6.2 to approximately 7.8.

In some implementations, the method can further include stirring the solution during heating.

In some implementations, drying the precipitate can include maintaining the precipitate at a temperature between approximately 90° C. to 120° C. for approximately 10 hours to approximately 14 hours.

In some implementations, the precipitate can be calcined at a temperature from approximately 400° C. to approximately 600° C. for approximately 4 hours to approximately 6 hours.

In some implementations, a heating rate of the calcination can be from approximately 4° C./minute to approximately 6° C./minute, and wherein a cooling rate of the calcination is from approximately 4° C./minute to approximately 6° C./minute.

In general, in another aspect, a system for removing hydrogen sulfide from an input gas includes a conduit between a source of the input gas and an output, and a portion of an adsorbent material disposed within the conduits. The adsorbent material includes copper oxide, magnesium oxide, and aluminum oxide. An atomic ratio of copper to magnesium to aluminum of the adsorbent material is X:Y:Z, where X is greater than or equal to 0.6 and less than or equal to 0.9, where Y is greater than or equal to 0 and less than or equal to 0.2, where Z is greater than or equal to 0 and less than or equal to 0.2, and where X+Y+Z is equal to 1.

In some implementations, the system can further include a sensor assembly at an outlet of the conduit, the sensor assembly being configured to determine that a concentration of hydrogen sulfide in an output gas at the outlet of the conduit exceeds a threshold concentration.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
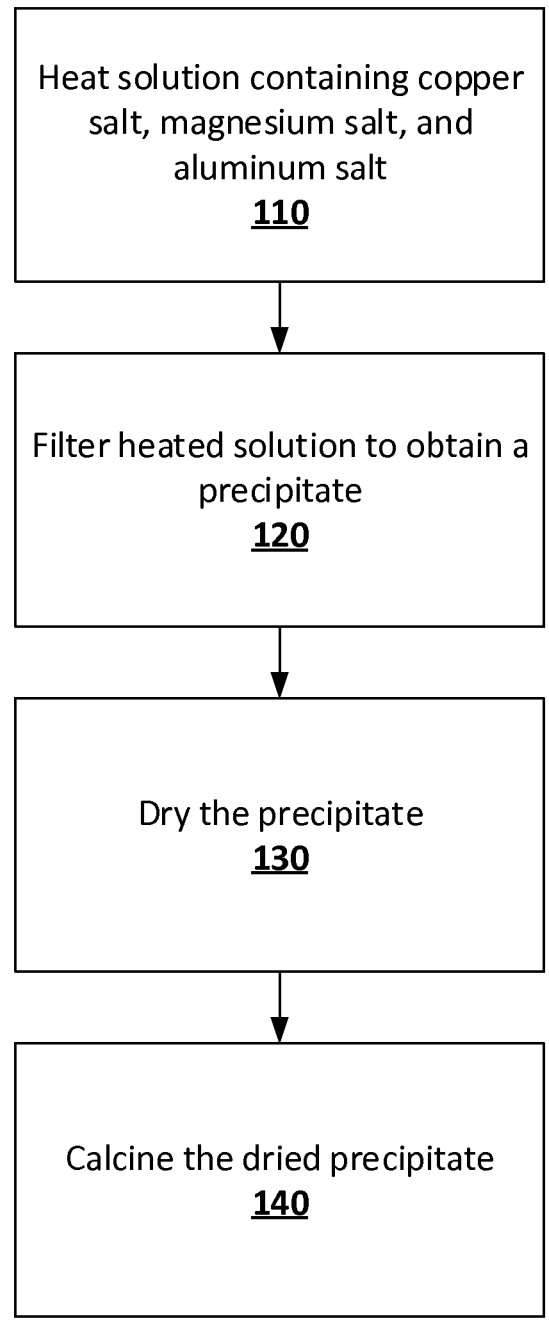
FIG. 1 shows an example process for synthesizing an adsorbent material.

Materials for adsorbing elemental sulfur from gases containing hydrogen sulfide are described herein. Implementations of the materials can be used, for example, to remove or otherwise separate hydrogen sulfide gas from other types of gases. Implementations of the adsorbent material can include a mixture of metal oxides of atomic copper (Cu), atomic magnesium (Mg), and atomic aluminum (Al), synthesized by co-precipitation. In some cases, the adsorbent material exhibits a high and stable sulfur capacity (e.g., in a range of approximately 2 to 10 mmol of sulfur/g of adsorbent, or more), such that it consistently adsorbs large amounts of sulfur when exposed to a source of gas containing hydrogen sulfide. Further, in some cases, the adsorbent material can be regenerated after adsorbing sulfur, such that some or all of the adsorbed sulfur is released from the adsorbent material. Thus, the adsorbent material can adsorb quantities of sulfur from a source of gas, and after regeneration, be reused to adsorb additional quantities of sulfur. In some cases, the regeneration process can recover approximately 70% to 100% of the original adsorbent capacity of the absorbent material. In some cases, the adsorbent material can be regenerated several times, or in some cases, a substantially unlimited number of times.

Implementations of the adsorbent material can include a mixture of metal oxides of atomic copper (Cu), atomic magnesium (Mg), and atomic aluminum (Al), synthesized by co-precipitation. In some cases, the mixture can be synthesized in such a way that the adsorbent material is homogenous, or substantially homogenous.

The amount of copper, magnesium, and aluminum can vary, depending on the implementations. For example, in some cases, the adsorbent material can be composed of copper oxide, magnesium oxide, and aluminum oxide, and the atomic ratio of copper to magnesium to aluminum of the adsorbent material can be X:Y:Z, where X (atomic copper) is greater than or equal to 0.6 and less than or equal to 0.9, Y (atomic magnesium) is greater than or equal to 0 and less than or equal to 0.2, Z (atomic aluminum) is greater than or equal to 0 and less than or equal to 0.2, and where X+Y+Z is equal to 1.

After adsorbing sulfur, the adsorbent material can be composed of copper oxide, magnesium oxide, aluminum oxide, and sulfur, and the atomic ratio of copper to magnesium to aluminum to sulfur of the adsorbent material can be X:Y:Z:S, where X (atomic copper) is greater than or equal to 0.6 and less than or equal to 0.9, Y (atomic magnesium) is greater than or equal to 0 and less than or equal to 0.2, Z (atomic aluminum) is greater than or equal to 0 and less than or equal to 0.2, and S (atomic sulfur) is greater than 0.

The adsorbent material can be implemented in a variety of forms. For example, in some cases, the adsorbent material can be implemented in a powder form, a pelletized form, or a combination thereof. The dimensions of each particle of powder or pellet can vary, depending on the implementation. For instance, in some cases, the dimensions of a particle of powder can have an agglomerated nano-rod morphology (e.g., a nano-dispersion of MgO and/or $Al_2O_3$ phases in a CuO crystalline structure), and can have a length of approximately 50 nm to 400 nm and a width of approximately 10 nm to 50 nm. In some cases, several particles can be adhered or bound together to form a pellet (e.g., a pellet having a length and/or width of 1 mm to 10 mm).

Further, in some cases, the adsorbent material can include materials other than metal oxides. For example, in some implementations, the adsorbent material can include a binding agent (e.g., silica) that provides adhesion to the mixture. In some cases, a binding agent can be used to produce powders or pellets having a particular shape and size. In some cases, a material can have approximately 5% to 40% by weight of the binding agent to 40% to 80% by weight, collectively, of copper oxide, magnesium oxide, and aluminum oxide.

Further still, in some cases, the adsorbent material can exhibit a change in morphology after one or more adsorption and regeneration cycles. For example, before regeneration, a particle of power can exhibit a nano-rod morphology, and after regeneration, the particle of powder can exhibit a lumped sphere-like morphology. Despite the change in morphology, however, the adsorbent material can still have a stable sulfur adsorption capacity.

FIG. 1 shows an example process 100 for synthesizing a material for adsorbing sulfur from a gas containing hydrogen sulfide.

The process 100 begins by heating a precursor solution containing copper salt, magnesium salt, and aluminum salt (step 110). For instance, the precursor can include metal nitrates, metal chlorides, metal acetates, alkali metal carbonates, or combinations thereof. As an example, the precursor can include copper nitrate, copper chloride, copper acetate, copper carbonate, magnesium nitrate, magnesium chloride, magnesium acetate, magnesium carbonate, aluminum nitrate, aluminum chloride, aluminum acetate, and/or aluminum carbonate. Other metal salts are also possible, depending on the implementation.

The atomic ratio of the metals can vary, depending on the implementation. For example, in some cases, the atomic ratio of copper to magnesium to aluminum of the precursor solution can be X:Y:Z, where X (atomic copper) is greater than or equal to 0.6 and less than or equal to 0.9, Y (atomic magnesium) is greater than or equal to 0 and less than or equal to 0.2, Z (atomic aluminum) is greater than or equal to 0 and less than or equal to 0.2, and where X+Y+Z is equal to 1.

Further, the molarity of the precursor solution also can vary. For example, in some cases, the precursor solution can have a molarity of approximately 0.5 M to 2 M (e.g., 1.25 M).

The temperature to which the precursor is heated can vary, depending on the implementation. For example, in some cases, the precursor can be heated to a temperature from approximately 50° C. to approximately 90° C. In some cases, the precursor solution can be heated by pre-heating a quantity of water (e.g., de-ionized water), and gradually adding the precursor solution to the pre-heated water. As an example, a quantity of precursor solution (e.g., 40 ml) can be gradually added to a pre-heated (e.g., 70° C.) quantity of de-ionized water through a syringe driven pump. The combined solution is then heated for a period of time (e.g., at 80° C. for one hour).

If the precursor is heated at a relatively lower temperature (e.g., in some implementations, less than 50° C.), gelatinous or gel-like precipitation may occur. However, if the precipitation can be heated at a relatively higher temperature (e.g., in some implementations, 50° C. or greater), the precipitation instead can be granular. This relatively higher temperature can be useful, for example, in obtaining nano-sized particles of precipitate. This can also be helpful, for example, in speeding up hydrolysis. In some cases, temperatures that exceed 90° C. may be undesirable, as water will evaporate at approximately 100° C., and may cause uncontrolled precipitation.

As the combined solution is being heated, the combined solution can be vigorously stirred. Further, the combined solution can be maintained at a particular pH (e.g., from approximately 6.2 to approximately 7.8). A particular pH can be maintained, for example, by in situ addition of a sodium carbonate solution (e.g., a 1.25 M sodium carbonate solution).

After the solution is heated, the solution is filtered to obtain a precipitate (step 120). In some cases, the solution can be filtered using a filter having a pore size of approximately to separate the precipitate from a filtrate. As an example, a filter having circular 70 mm diameter can be used. The precipitate can be washed with a washing solution one or more times after filtration. For example, the filtrate can be washed several times with de-ionized water until the pH of the filtrate becomes approximately 7.

After filtering the precipitate from the filtrate, the obtained precipitate is dried (step 130). The temperature and length of time in which precipitate is dried can vary, depending on the implementation. For example, in some cases, the precipitate can be dried at a temperature greater than 100° C. (e.g., approximately 110° C.) for approximately 12 hours. As another example, in some cases, the precipitate can be dried at a temperature between approximately 90° C. to 120° C. for approximately 10 hours to approximately 14 hours. Other temperatures and lengths of time are also possible, depending on the implementation. For example, the precipitate can be dried at a temperature and for a time appropriate to remove all or substantially all of the entrained water.

After the precipitate is dried, the precipitate is calcined (step 140). The temperature, rate of heating, rate of cooling, and length of time can each vary, depending on the implementation. For example, in some cases, the precipitate can be heated under flowing air (e.g., air having a flow rate of 50 ml per minute) from room temperature (e.g., 20° C. to 22° C.) to 500° C. at a heating rate of 5° C. per minute. The precipitate can be held at 500° C. for five hours, then cooled to room temperature at a heating rate of 5° C. per minute. Although example temperatures, rate of heating, rate of cooling, and length of time is described above, this is merely an illustrate example. In practice, other parameters also may be used, depending on the implementation. For example, in some cases, the precipitate can be calcined at a temperature from approximately 400° C. to approximately 600° C. for approximately 4 hours to approximately 6 hours. As another example, in some cases, a heating rate of the calcination can be from approximately 4° C./minute to approximately 6° C./minute, and the cooling rate of the calcination can be from approximately 4° C./minute to approximately 6° C./minute.

In some implementations, during the synthesis process, an intermediate material composed primarily of hydroxides of the metals may be formed. In some implementations, a temperature of approximately 300° C. or greater allows the hydroxides to transform fully or substantially fully to their oxide forms. Further, in some cases, temperature of 600° C. or less may result in an adsorbent with improved regeneration characteristics. Thus, in some implementations, the precipitate can be calcined at a temperature between approximately 300° C. to 600° C., for an appropriate length of time (e.g., between approximately three hours to ten hours).

In some cases, after calcining, the resulting material can be mixed with other materials (e.g., a binding agent), and/or shaped into a powder or pellet. This can be beneficial, for example, as particular forms of the adsorbent material may be more convenient to transport or use, depending on the application.

As described above, implementations of the adsorbent material can be used to remove or otherwise separate hydrogen sulfide gas from other types of gases. For example, an amount of the adsorbent material can be exposed to an input gas containing hydrogen sulfide. The adsorbent material adsorbs some or all of the atomic sulfur contained in the input gas, resulting in an output gas having a reduced or substantially zero concentration of hydrogen sulfide. In some cases, the input gas can have a temperature in the range of approximately 0° C. to 700° C. (e.g., in some instances, in a range of approximately 100° C. to 200° C.).

As described above, implementations of the adsorbent material can be regenerated after adsorbing sulfur, such that some or all of the adsorbed sulfur is released from the adsorbent material. For instance, implementations of the adsorbent material can be regenerated by exposing the adsorbent material to an oxidizing gas at temperatures greater than or equal to the temperature of the input gas containing the hydrogen sulfide. As an example, if the adsorbent material had been exposed to an input gas having a temperature approximately 150° C., the adsorbent material can be regenerated by exposing the adsorbent material to an oxidizing gas having a temperature of approximately 150° C. or greater. In some implementations, the oxidizing gas can be oxygen gas (e.g., $O_2$ gas) or an oxygen-containing gas, such as air. In some cases, the oxidizing gas can contain approximately 5% $O_2$ in $N_2$.

In some cases, the adsorbent material can be further regenerated by first exposing the adsorbent material to an oxidizing gas, and subsequently exposing the adsorbent material to a reducing gas. In some implementation, the reducing gas can be a gas containing hydrogen (e.g., a gas having greater than 0% to approximately 10% hydrogen by volume), a gas containing methane (e.g., a gas having greater than 0% to approximately 90% methane volume), or a gas containing water (e.g., a gas having greater than 0 to 100% water by volume).

In an example application, the adsorbent material can be exposed to an input gas containing hydrogen sulfide gas, such that the adsorbent material adsorbs quantities of sulfur from the input gas. The adsorbent material can be subsequently regenerated, such that some or all of the adsorbed sulfur is removed from the adsorbent material. After regeneration, the adsorbent material can be reused to adsorb additional quantities of sulfur from an input gas. In some cases, the adsorbent material can be cyclically exposed to an input gas containing hydrogen sulfide and an oxidizing gas, such that it is repeatedly regenerated between sulfur adsorption. As an example, in some cases, the adsorbent material can exhibit an initial sulfur capacity in a range of approximately 2 to 10 mmol of sulfur/g of adsorbent, and after one or more regeneration cycles, can continue to exhibit approximately 70% to 100% of the initial sulfur capacity (e.g., between approximately 1.4 mmol of sulfur/gram of adsorbent material to approximately 10 mmol of sulfur/gram of adsorbent material).

The adsorbent material has a variety of practical applications. For example, in some cases, the adsorbent material can be used during industrial processes such as gas processing, gas to liquid processing, Claus processing, coal gasification, and petroleum refining to remove or otherwise reduce the presence of hydrogen sulfide from a stream of gas (e.g., an exhaust gas from the industrial process). In further examples, in some cases, the adsorbent material can be used to remove hydrogen sulfide from syngas used in Fisher-Tropsch processes, or removal of hydrogen sulfide from syngas used in urea and ammonia production. Further, as implementations of the adsorbent material can be regenerated one or more times, the adsorbent material can be integrated into industrial processes in an efficient and cost effective manner.

Figure 2:
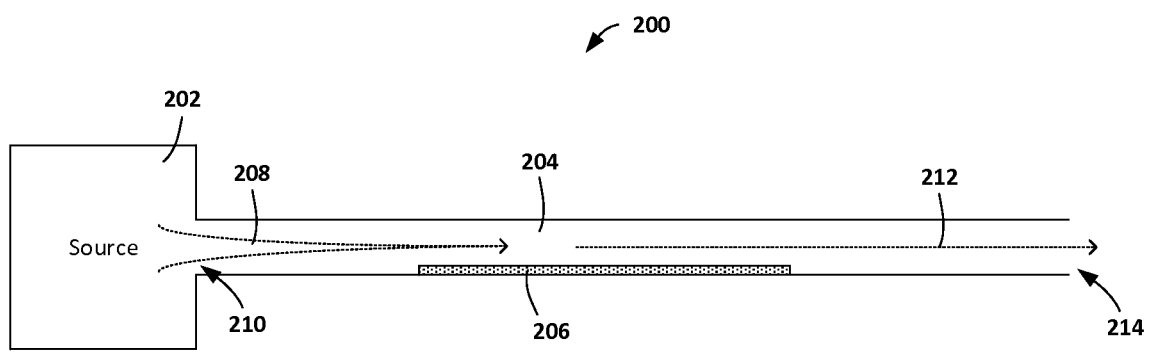
FIG. 2 shows an example system for removing hydrogen sulfide gas from an input gas.

FIG. 2 schematically shows an example system 200 for removing hydrogen sulfide gas from an input gas. The system 200 includes a source 202, a conduit 204 coupled to the source 202, and a portion of adsorbent material 206 disposed within the conduit 202.

The source 202 is a source for an input gas 208. The source 202 can be, for example, a container for storing gas (e.g., a storage tank or a silo) or a conduit (e.g., a pipe or tube) for conveying gas from an external source, such as a well. In some cases, the source 202 can be the output of an industrial process (e.g., a gas exhaust from one or more processing apparatuses).

The conduit 204 is coupled to the source 202, such that the input gas 208 from the source 202 enters a first aperture 210 of the conduit 204 and passes across the adsorbent material 206. As described above, upon exposure to the input gas 208, the adsorbent material 206 adsorbs sulfur from the input gas 208. As a result, some or all of the sulfur contained within the input gas 210 is removed. As an example, if the input gas contains hydrogen sulfide gas, some or all of the hydrogen sulfide gas may be removed. The resulting output gas 212 is directed to a second aperture 214 of the conduit 204 for collection.

The adsorbent material 206 can be positioned in various ways within the conduit 204. For example, in some cases, the adsorbent material can be disposed on one or more beds or trays, and the beds or trays can be inserted into the conduit 204. In some cases, the adsorbent material can be positioned directly onto the conduit 204 itself (e.g., positioned directly on a wall of the conduit 204). In some cases, the adsorbent material 206 can be integrally formed with the conduit 204 (e.g., such that the adsorbent material 206 is provided as a layer or wall of the conduit 204).

As described above, the adsorbent material can be regenerated, such that the adsorbed sulfur in the adsorbent material 206 is removed. This can be performed, for example, by stopping the flow of input gas 208 from the source 202 into the conduit 204 (e.g., by sealing the source 202 or redirecting the input gas 208), and coupling the conduit 204 to a source of oxidizing and/or reducing gas (e.g., one or more storage tanks or silos containing oxidizing and/or reducing gas, or one or more pipes or tubes conveying oxidizing and/or reducing gas from an external source). This also can be performed, for example, by removing the adsorbent material 206 from the conduit 204, exposing the adsorbent material 206 to an oxidizing gas and/or reducing gas, and reintroducing the adsorbent material 206 into the conduit 204.

In some cases, a system can include two or more portions of adsorbent material in which at least one portion of adsorbent material is used to adsorb sulfur in an input gas, and at least another portion of adsorbent material is being regenerated. The portions of adsorbent material can be cycled between adsorption and regeneration, such that at least one portion of adsorbent material is removing sulfur from an input gas, even as one or more other portions of adsorbent material are being regenerated.

Figure 3A:
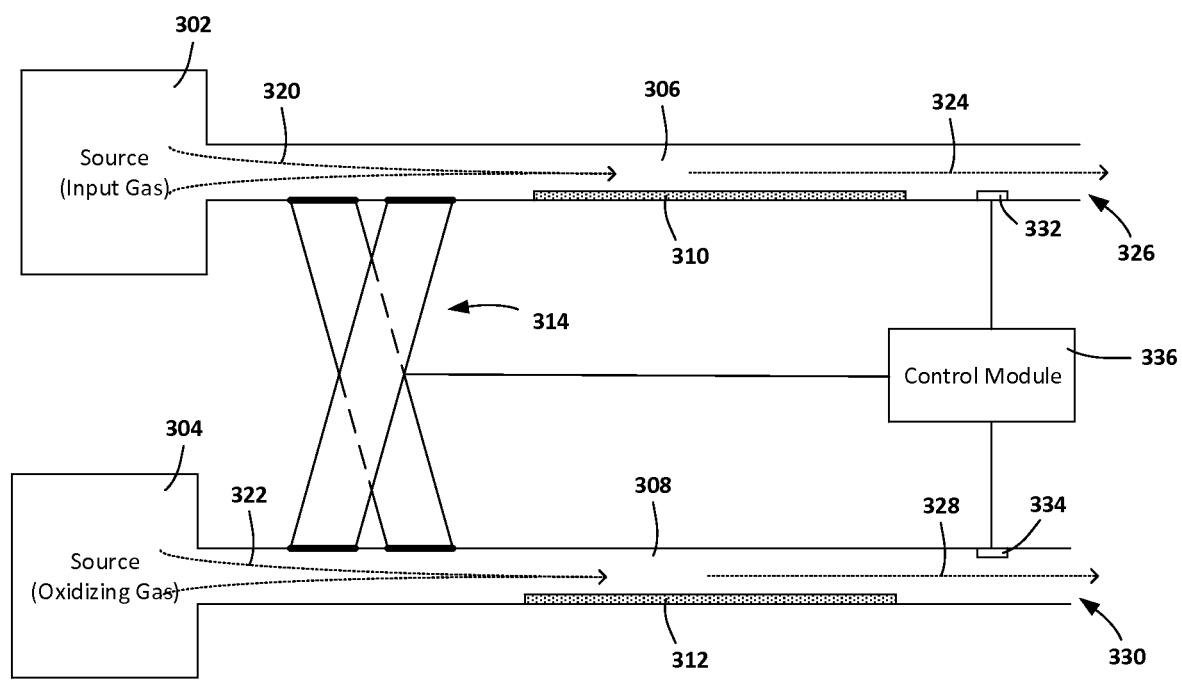
FIGS. 3A and 3B show another example system for removing hydrogen sulfide gas from an input gas.
Figure 3B:
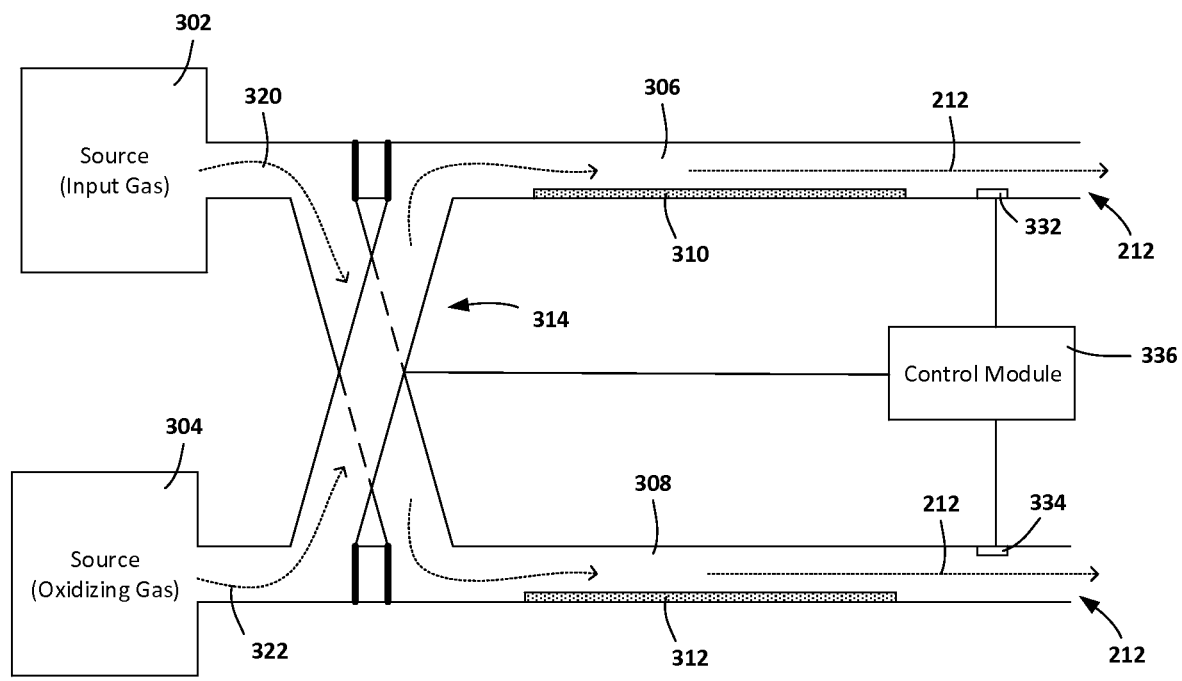

As an example, FIGS. 3A and 3B schematically show another system 300 for removing hydrogen sulfide gas from an input gas. The system 300 includes a first source 302, a second source 304, a first conduit 306, a second conduit 308, a first portion of adsorbent material 310, a second portion of adsorbent material 312, and a valve assembly 314.

The first source 302 is a source of an input gas 320. The first source 302 can be, for example, a container for storing gas (e.g., a storage tank or a silo) or a conduit (e.g., a pipe or tube) for conveying gas from an external source, such as a well. In some cases, the first source 302 can be the output of an industrial process (e.g., a gas exhaust from one or more processing apparatuses).

The second source 304 is a source of an oxidizing gas 322. The source 304 also can be, for example, a container for storing gas (e.g., a storage tank or a silo) or a conduit (e.g., a pipe or tube) for conveying gas from an external source, such as a well.

The first conduit 306 and the second conduit 308 are coupled to both the first source 302 and the second source 304 through a valve assembly 314. As shown in FIG. 3A, when the valve assembly 314 is in a first configuration, input gas 320 from the first source 302 is directed through the first conduit 306, while oxidizing gas 322 from the second source 304 is directed through the second conduit 308.

As described above, upon exposure of the input gas 320 to the first portion of adsorbent material 310, the first portion of adsorbent material 310 adsorbs sulfur from the input gas 320. As a result, some or all of the sulfur contained within the input gas 320 is removed. As an example, if the input gas contains hydrogen sulfide gas, some or all of the hydrogen sulfide gas may be removed. The resulting output gas 324 is directed to an outlet 326 of the first conduit 306 for collection.

As also described upon, upon exposure of the oxidizing gas 322 to the second portion of adsorbent material 312, the second portion of adsorbent material 312 is regenerated (e.g., releases previously adsorbed sulfur). The resulting output gas 328 is directed to an outlet 330 of the second conduit 328 for collection.

As shown in FIG. 3B, when the valve assembly 314 is in a second configuration, input gas 320 from the first source 302 is directed through the second conduit 308, while oxidizing gas 322 from the second source 304 is directed through the first conduit 306.

As described above, upon exposure of the input gas 320 to the second portion of adsorbent material 312, the second portion of adsorbent material 312 adsorbs sulfur from the input gas 320. As a result, some or all of the sulfur contained within the input gas 320 is removed. As an example, if the input gas contains hydrogen sulfide gas, some or all of the hydrogen sulfide gas may be removed. The resulting output gas 324 is directed to the outlet 330 of the first conduit 306 for collection.

As also described above, upon exposure of the oxidizing gas 322 to the first portion of adsorbent material 310, the first portion of adsorbent material 310 is regenerated (e.g., releases previously adsorbed sulfur). The resulting output gas 328 is directed to the outlet 326 of the first conduit 306 for collection.

The valve assembly 314 can be switched between the first and second configurations, such that at a given moment, at least one portion of adsorbent material is being exposed to the input gas, while at least another portion of adsorbent material is being regenerated. Thus, sulfur can be continuously removed from the input gas, even as one or more portions of adsorbent material are being regenerated.

In some cases, the can also include one or more sensor assemblies to monitor the concentration of sulfur from the output gas. This can be useful, for example, in determining that a portion of adsorbent material is nearing its adsorbent capacity and should be regenerated. This also can be useful, for example, in determining the effectiveness of the sulfur removal process. As an example, as shown in FIGS. 3A-B, the system 300 can include a first sensor 332 positioned within the first conduit 306, and a second sensor 334 positioned within the second conduit 308. The first sensor 332 and the second sensor 334 are positioned downstream from the first portion of adsorbent material 310 and the second portion of adsorbent material 312, respectively. Thus, the first sensor 332 can measure the concentration of sulfur in the output gas 324 when the valve assembly 314 is in the first configuration, and the second sensor 334 can measure the concentration of sulfur in the output gas 324 when the valve assembly 314 is in the second configuration.

In some cases, the valve assembly 314 can switch between the first and second configurations based on inputs provided by an operator. For example, an operator can review measurements from the sensors 332 and 334, and based on the measurements, determine that one of the portions of adsorbent material should be regenerated. The operator can select an appropriate configuration for the valve assembly 314, such that oxidizing gas is directed across the portion of adsorbent material that should be regenerated, and the input gas is directed across the other portion of adsorbent material.

In some cases, the valve assembly 314 can automatically switch between the first and second configurations. For example, a control module 336 can receive measurements from review measurements from the sensors 332 and 334, and based on the measurements, determine that one of the portions of adsorbent material should be regenerated. As an example, the control module can determine whether the concentration of sulfur in an output gas has exceed a particular threshold concentration. If the concentration of sulfur exceeds the threshold concentration, this may indicate that the adsorbent material is no longer adsorbing sulfur as effectively, and should be regenerated. As another example, the control module can determine whether the concentration of sulfur in an output gas has increased over time. If the change in sulfur concentration exceeds a particular threshold, this may indicate that the adsorbent material is no longer adsorbing sulfur as effectively, and should be regenerated. Based on this determination, the control module 336 can select an appropriate configuration for the valve assembly 314, such that oxidizing gas is directed across the portion of adsorbent material that should be regenerated, and the input gas is directed across the other portion of adsorbent material.

Although an example system is described above, this is merely an illustrative example. In practice, a system can include any number of sources (e.g., one, two, three, four, or more), any number of conduits with adsorbent material (e.g., one, two, three, four, or more), and a valve assembly having any number of configurations for directing gas between them.

Further, although a source of input gas and a source of oxidizing gas are shown, in some cases, a system can further include a source of reducing gas. Correspondingly, the valve assembly can be configured to, in a first configuration, direct input gas across a first portion of adsorbent material, and sequentially direct oxidizing gas and reducing gas across a second portion of adsorbent material. The valve assembly also can be configured to, in a second configuration, direct input gas across the second portion of adsorbent material, and sequentially direct oxidizing gas and reducing gas across the first portion of adsorbent material.

As another example, a system can include three portions of adsorbent material, each positioned in a respective conduit. The valve assembly can be configured to cyclically direct input gas across one of the portions of adsorbent material, oxidizing gas across another one of the portions of adsorbent material, and reducing gas across another one of the portion of adsorbent material. Thus, each gas can be exposed to the input gas, then the oxidizing gas, followed by the reducing gas. In this manner, sulfur is continuously removed from the input gas by one of the portions of adsorbent material, even while the other two portions of adsorbent material are being regenerated.

Although the removal of hydrogen sulfide is described above, this is also merely an illustrative example. In some implementations, other sulfur species, such as carbonyl sulfide, carbon disulfide, sulfur dioxide, sulfur trioxide, and/or element sulfur also can be removed from an input gas. As an example, an input gas can be hydrogenated, such that some or all of the sulfur containing species are transformed to hydrogen sulfide. In some cases, a hydrogenating agent can be used as a part of the hydrogenation process. Hydrogenating agents can include, for example, hydrogen and/or carbon monoxide that exists natively within the input gas, or added to the input gas prior to hydrogenation. The effluent of the hydrogenation can be introduced into the system.

Example Adsorbent Materials

Implementations of the adsorbent material were tested to evaluate their sulfur removal performance and regenerative characteristics. The adsorbent material were characterized by various techniques such as XRD, nitrogen adsorption-desorption, SEM, HR-TEM with HAADF-STEM and ChemiSTEM technology. The sulfur removal performance of the adsorbent material was tested for dynamic breakthrough experiments at 150° C. for the gas stream having approximately 100 ppm $H_2S$ in Helium. In this study, the adsorbent material exhibited stable breakthrough sulfur capacity of ~9 mmol/g for 10 cycles of sulfidation and regeneration. The regeneration experiments were carried out at 500 and 600° C. with various conditions. It was found that the adsorbent material exhibited very stable sulfur capacity regardless of significant changes in morphology that occurred after multiple adsorption/regeneration cycles. In addition, the adsorbent material was also tested for high $H_2S$ concentration along with water and simulated gas mixes.

Synthesis:

The adsorbent material was synthesized by taking 40 ml of the mixture containing 1.25 M solution of copper nitrate, magnesium nitrate, and aluminum nitrate with the specified mole ratio in a 50 ml syringe. The atomic ratio of the metals was varied between 0.6 and 0.9 (Cu):0 and 0.2 (Mg): 0 and 0.2 (Al) for each of several samples. In a separate 500 ml PP bottle, 100 ml of de-ionized water was taken and placed into the oil bath at 70° C. under vigorous stirring. The mixed metal precursor solution was added into the water containing PP bottle at the rate of 5 ml/min by a syringe driven pump and the pH of the entire solution was maintained at approximately 7 by in situ addition of 1.25 M sodium carbonate solution. Upon complete addition of mixed metal precursor solution, the whole mixture was kept at 80° C. for one hour under continuous stirring. The precipitate was filtered and washed several times with de-ionized water until the pH of the filtrate becomes approximately 7. The filtered material was dried at 110° C. for 12 hours and then calcined at 500° C. for 5 hours under flowing air (50 ml/min). For calcination, the heating rate was 5° C./min to reach 500° C. from room temperature and the cooling rate was also set at 5° C./min from 500° C. to room temperature.

All the chemicals of reagent grade were purchased from Sigma-Aldrich, USA and used as received without any further purification.

Characterization:

The adsorbent was characterized by x-ray diffraction (XRD), nitrogen adsorption-desorption measurements, field emission-scanning electron microscopy (FE-SEM), high resolution transmission electron microscopy (HR-TEM) equipped with HAADF-STEM and ChemiSTEM technology. The powder X-ray diffraction (XRD) patterns were collected in a PANAlytical diffractometer (X'Pert PRO) equipped with a Cu-Kα radiation source (λ=0.15406 nm) for a 2θ range extending between 10 and 80° at an angular rate of $0.02°s^{-1}$. The nitrogen sorption analysis was carried out in Autosorb-6B manufactured by Quantachrome Instruments at liquid nitrogen having a temperature of 77 K. The adsorbent material was outgassed at 250° C. for 6 hours prior to analysis. The SEM analysis was conducted in FEI Quanta 250 (FEG) at 20 kV. TEM investigation was carried out at Talos™ F200X. For TEM analysis, the sample was prepared by grinding the powder with a pestle and mortar and a small amount of cyclohexane was used to transfer the powder to the grid.

Breakthrough Experiments:

The breakthrough rig was constructed using ¼ inch SS 316 tubing, fittings and valves from Swagelok Company, USA. The $H_2S$ adsorption experiments were carried out in a fixed bed U-shaped quartz reactor having 4 mm internal diameter. The fixed bed of the adsorbent material was made by packing 5 mgs of adsorbent material diluted with 100 mgs of quartz particles and supported either side by quartz wool in the reactor. Prior to packing into the reactor, both the adsorbent material and the diluent were sieved between the mesh size of 40 and 80. It was confirmed by carrying out blank experiment that quartz particles does not adsorb any $H_2S$ under the set experimental conditions. Prior to $H_2S$ adsorption, the adsorbent material packed reactor was preheated under helium flow at 300° C. for overnight and then allowed to react with $H_2S$ gas having approximately 100 ppm $H_2S$ in He (Praxair, USA) at 150° C. and at 1 atmospheric pressure and the flow rate of the gas was maintained at approximately 42 ml/min. The evolution of the $H_2S$ concentration at the reactor exit was monitored continuously by on-line GC (Agilent 7890A) equipped with a sulfur chemiluminescence detector (SCD). The sulfur breakthrough capacity of the adsorbent was determined at an exit $H_2S$ concentration reaching 5% of the feed gas at the reactor inlet.

Figure 4:
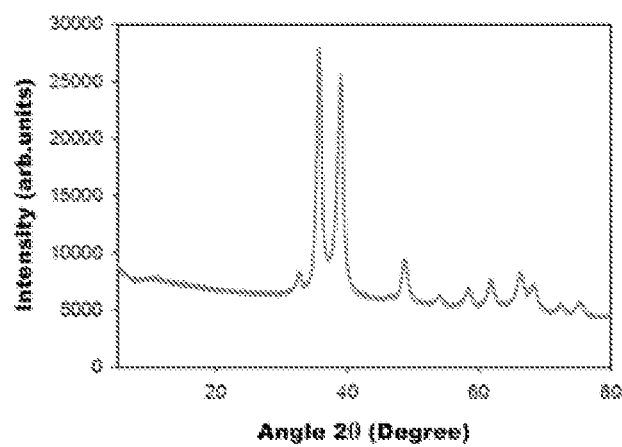
FIG. 4 shows an XRD pattern of an example adsorbent material.

Results and Discussion:

The XRD pattern in FIG. 4 indicates that the adsorbent material is crystalline with predominant CuO phase (ICDD: 00-045-0937). Though most of the peaks are corresponding to CuO phase, peak broadening can be seen in all the peaks against the sharp high intense peaks of typical CuO. This peak broadening could be owing to nano-dispersion of MgO or $Al_2O_3$ phases in the CuO crystalline structure. In addition to CuO phase, little matching of spinal $MgAl_2O_4$ (ICDD: 04-013-1994) was also identified, however it is difficult to distinguish the phases of $CuAl_2O_4$ and $MgAl_2O_4$ spinels by XRD, because their patterns are relatively similar and these patterns might overlap with MgO characteristic peaks. However, typical alumina peaks cannot be seen in the patterns due to lower concentration in the mixed metal oxides composition.

Figure 5:
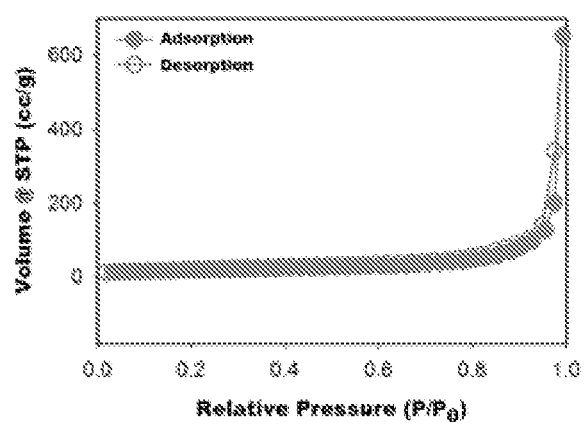
FIG. 5 shows a nitrogen adsorption-desorption isotherm of an example adsorbent material.

The $N_2$ adsorption-desorption isotherm of the adsorbent material is shown in FIG. 5. The isotherm indicates that the adsorbent is non porous material and conversely it holds considerable BET surface area of ~67 $m^2/g$, estimated from the adsorption branch of isotherm. This significant surface area value is due to the external surface area deduced from the nano-rod shaped particles of the adsorbent.

Figure 6:
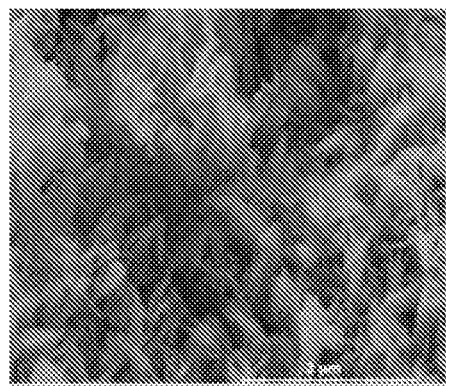
FIG. 6 shows an SEM image of an example adsorbent material.
Figure 7:
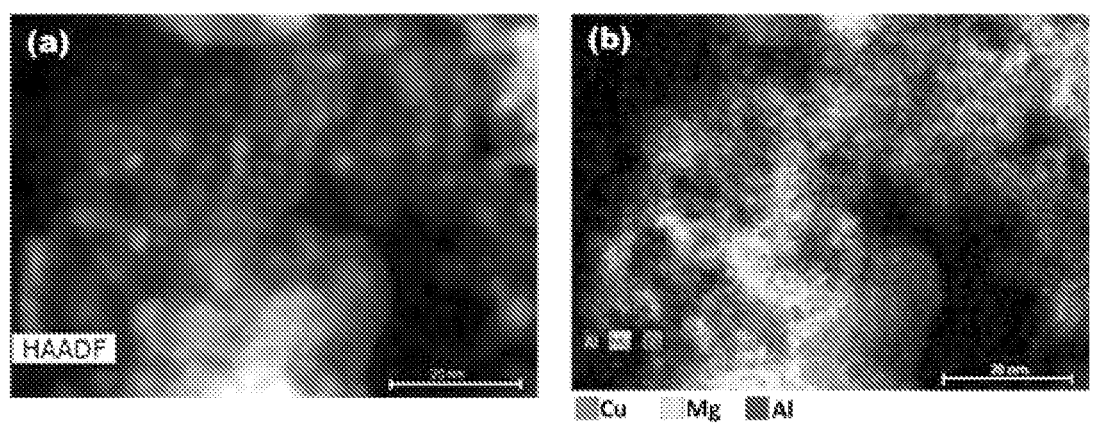
FIG. 7 shows (a) an HAADF image and (b) a ChemiSTEM elemental mapping of an example adsorbent material.

The SEM image in FIG. 6 shows the morphology of the adsorbent material. Contrary to CuO morphology, the adsorbent material owns homogeneously agglomerated nano-rods morphology and the morphology is very unique all over the particles. This well-designed uniform nano-rods morphology could be explained as the nano-level dispersion of MgO and $Al_2O_3$ with CuO particles. In order to evaluate the elemental distribution in the adsorbent, HAADF-STEM image was taken in HR-TEM machine and the corresponding image was analysed by ChemiSTEM method (as shown in FIG. 7). ChemiSTEM elemental mapping indicated the presence of three different phases corresponding to Cu, Mg and Al oxides of the adsorbent. However, nano-level dispersion of metal oxides with one another can be observed. This existence of nano-level dispersion among the metal oxides by ChemiSTEM analysis coincides with XRD and SEM results.

Breakthrough Performances and Regeneration Study:

$H_2S$ breakthrough performance of the adsorbent was tested at 150° C. adsorption temperature for a gas stream containing approximately 100 ppm $H_2S$ in helium. However, two sets of regeneration experiments were carried out. The first set of regeneration experiments were performed at 500° C. for the total duration of 24 hours (12 hours oxidation using 5% $O_2$ in $N_2$ and 12 hours of He purging at a flow rate of approximately 50 ml/min). In the second set, regeneration experiments were adjusted to simulate a practical application in which the regeneration duration equals to the $H_2S$ saturation time. In this case, the regeneration study was carried out at 600° C. for the total duration of 6 hours by passing 5% $O_2$ in $N_2$ at the flow rate of ~50 ml/min.

Figure 8:
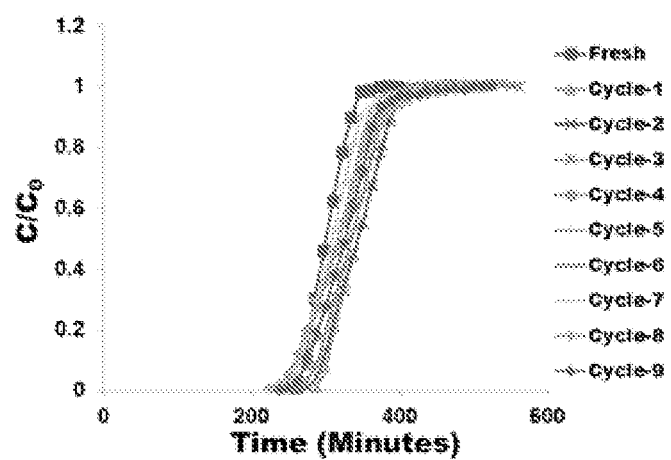
FIG. 8 shows $H_2S$ breakthrough curves for an example adsorbent material. Adsorption conditions: temperature: 150° C., gas: ~100 ppm $H_2S$ in He, flow: ~42 ml/min. Regeneration conditions: temperature: 500° C., 12 hours of 5% $O_2$ in $N_2$ and 12 hours of He.

The breakthrough curves for 10 sulfidation-regeneration cycles (fresh+9 cycles) are shown in FIG. 8, in which the regeneration cycles were conducted at 500° C. The adsorbent material demonstrated stable sulfur capacity of ~9 mmol/g after 10 cycles. The high capacity is due to occurrence of reactive chemisorption of this adsorbent material with $H_2S$ during adsorption process as in reaction 1. Interestingly, no effluents were produced in the consecutive adsorption cycles if the sulfided adsorbent material underwent regeneration for 24 hours. In these experiments, 12 hours of oxidation and 12 hours of He appear to be particularly effective in avoiding any effluents in the following adsorption cycle. This is due to slow decomposition of metal sulfates predominantly copper sulfate, which could have formed during regeneration as it shown in reaction 2.

Figure 9:
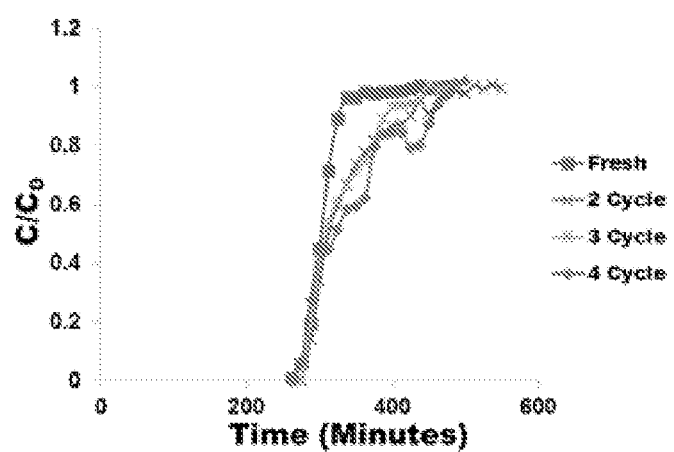
FIG. 9 shows $H_2S$ breakthrough curves for an example adsorbent material. Adsorption conditions: temperature: 150° C., gas: ~100 ppm $H_2S$ in He, flow: ~42 ml/min. Regeneration conditions: temperature: 600° C., 6 hrs of 5% $O_2$ in $N_2$.

FIG. 9 shows breakthrough curves for 5 cycles (fresh+4 cycles) where the regeneration was performed at 600° C. for 6 hours. The adsorbent material exhibited the same stable sulfur capacity of ~9 mmol/g within this short regeneration duration and no formation of effluents was detected in the successive adsorption cycles. This can be explained as full decomposition of $CuSO_4$ within 6 hours at 600° C., because the decomposition temperature for $CuSO_4$ is <600° C. To the best of our knowledge, this is the highest ever reported sulfur capacities with 10 cycles of successive sulfidation at 150° C. $H_2S$ adsorption process, considering the short regeneration time. Moreover, the regeneration duration equals the $H_2S$ saturation duration, which could be beneficial in industrial applications.

The sulfur capacities shown in Table 1 demonstrate that the adsorbent material is a high capacity stable adsorbent.

TABLE 1

A collection of published data on mixed metal oxides for H₂S removal study and their sulfur capacities

| Adsorbent | BT Capacity (mmol/g) | No. of Cycles | Temp. (° C.) |
|---|---|---|---|
| Developed CuO—MgO—Al₂O₃ Adsorbent Material | 9 | 10 | 150 |
| BASF (SG901) ZnO [Commercial] | 0.34 | 1 | RT |
| Sud-Chemie (G-72E) ZnO [Commercial] | 0.75 | 1 | RT |
| ZnO/SiO₂ | 1.6 | 1 | RT |
| Cu—ZnO/SiO₂ | 2.4 | 1 | RT |
| Zn—Al based-cp (co-precipitation) | 5.3 | 10 | 480 |
| Zn—Al based (Physical Mixing) | 4.8 | 10 | 480 |
| (a) Fe promoted Zn—Al-cp, (b) Co promoted Zn—Al-cp, (c) Nickel promoted Zn—Al-cp and (d) Cerium promoted Zn—Al-cp | 5.3 to 6.2 | 10 | 480 |
| Cu—ZnO/SBA-15 | 2.3 | 5 | 150 |
| Cu—ZnO/silica gel | 1.1 | 1 | 150 |
| Cu—ZnO/γ-Al₂O₃ | 8.53 | 1 | 250 |
| 1 wt % P—Cu—ZnO/g-Al₂O₃ | 8.69 | 1 | 250 |
| 3 wt % P—Cu—ZnO/g-Al₂O₃ | 10.74 | 1 | 250 |
| 9 wt % P—Cu—ZnO/g-Al₂O₃ | 8.35 | 1 | 250 |
| CuO—ZnO—Al₂O₃-mp | 2.1 | 1 | 40 |
| CuO—ZnO—Al₂O₃-mp | 4.26 | 1 | 100 |
| CuO—ZnO—Al₂O₃-mp | 7.3 | 1 | 40 |
| CuO—ZnO—Al₂O₃-mp | 10.8 | 1 | 80 |
| CuO | 8.8 | 1 | RT |
| Zn/Cu/Zr mixed oxides | 4.2 | 1 | RT |
| Zn/Ti/Zr mixed oxides | 4.5 | 1 | RT |
| Zn/Co/Al | 3.3 | 1 | RT |
| Mn—Cu mixed oxides | 4.4 | 6 | 627 |
| Mn—Cu—V mixed oxides | 1.7 | 5 | 627 |
| Cu-ETS-2 | 1.5 | 1 | RT |
| Cu-ETS-4 | 0.34 | 1 | RT |
| Cu-ETS-10 | 1.4 | 1 | RT |

$CuO + H_2S \rightarrow CuS + H_2O$ Reaction-1
$CuS + 1.5 O_2 \rightarrow CuO + SO_2$ Reaction-2

Figure 10:
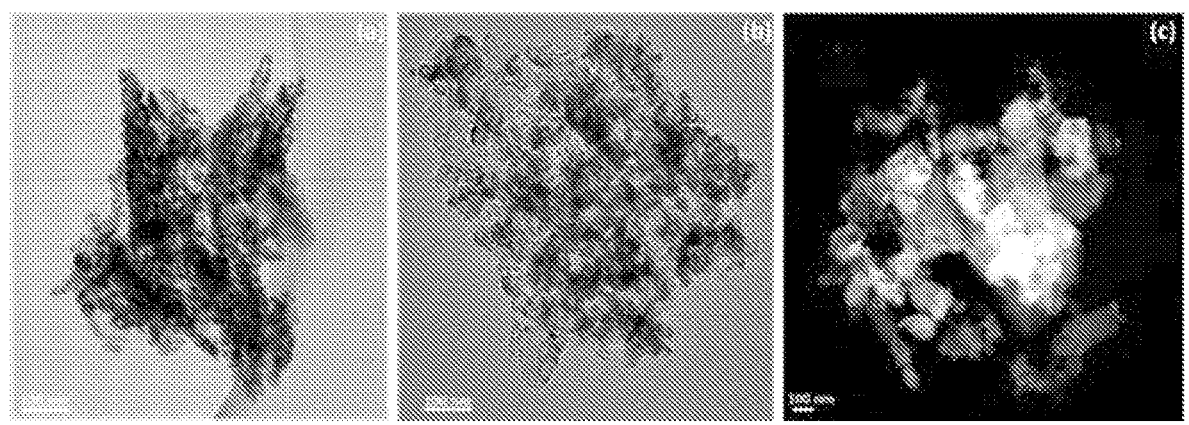
FIG. 10 shows HR-TEM images for (a) fresh, (b) sulfide, and (c) regenerated example adsorbent materials.

Since the adsorbent materials showed excellent performance towards H₂S adsorption, it is noteworthy to see the morphological effect of fresh, sulfided and regenerated adsorbent states. TEM analyses were carried out on the fresh, sulfided and regenerated samples and the images are shown in FIG. 10. Fresh adsorbent material exhibited agglomerated nano-rods morphology as showed by SEM. However, significant change in morphology had occurred during the cycles of sulfidation and regeneration. Despite the change in morphology, the adsorbent material showed stable capacity in H₂S adsorption.

Figure 11:
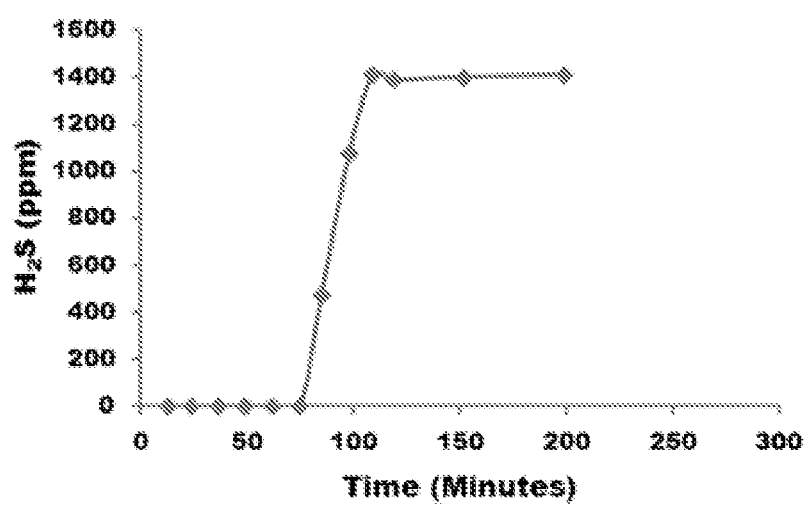
FIG. 11 shows $H_2S$ breakthrough curves for an example adsorbent material. Adsorption conditions: temperature: 150° C., flow rate: ~42 ml/min, adsorbent weight: 25 mg, gas composition: [$H_2S$: ~1435 ppm, $H_2$: ~2.47 (mole %), Water: ~30.89 (mole %), CO:~0.0098 (mole %), $CO_2$: ~17.37 (mole %), $N_2$:~49.12%].

Effect of H₂S Concentration and Gas Mixes:

To elucidate the suitability of adsorbent material for practical application, the adsorbent material was also tested for high concentration of H₂S (approximately 1435 ppm) along with other gas mixes [H₂:~2.47 (mole %), Water: ~30.89 (mole %), CO:~0.0098 (mole %), CO₂:~17.37 (mole %), N₂:~49.12%], and the corresponding breakthrough curve is displayed in FIG. 11. The adsorbent material exhibited the same sulfur capacity in presence of high H₂S concentration, water and other gases, and thus can be suitable for a variety of practical applications.

Summary:

An example high capacity and regenerable solid adsorbent material was evaluated for the removal H₂S at 150° C. Co-precipitation technique permitted to synthesize mixed metal oxides with nano-rods morphology. The adsorbent material demonstrated stable sulfur capacity of ~9 mmol/g for after 10 adsorption-regeneration cycles. Although the adsorbent material underwent significant morphological change after many sulfidation-regeneration cycles, stable sulfur capacity was sustained. Complete regeneration on the sulfided adsorbent was achieved within 6 hours at 600° C. The 6 hours regeneration duration is equal to the H₂S saturation time of the adsorbent, which may be beneficial in practical applications. Since the adsorbent material showed stable sulfur capacity at the adsorption and regeneration conditions in this study, it is foreseeable that the stability could last for endless cycles. Further, the breakthrough performance and sulfur capacity of the adsorbent material is similar in presence of high H₂S concentration (~1435 ppm), water and other gases.

What is claimed is:

1. A method of removing hydrogen sulfide from an input gas, the method comprising:
    exposing an adsorbent material to an input gas, at a temperature of greater than or equal to 150° C. and less than or equal to 200° C., to obtain an output gas, wherein a concentration of hydrogen sulfide of the output gas is less than a concentration of hydrogen sulfide of the input gas;
    the adsorbent material comprising copper oxide, magnesium oxide, and aluminum oxide, wherein an atomic ratio of copper to magnesium to aluminum of the adsorbent material is X:Y:Z,
    wherein X is greater than or equal to 0.6 and less than or equal to 0.9,
    wherein Y is greater than 0 and less than or equal to 0.2,
    wherein Z is greater than 0 and less than or equal to 0.2, and
    wherein X+Y+Z is equal to 1;
    regenerating the adsorbent material after exposing the adsorbent material to the input gas, and
    alternating the exposing and the regenerating in a sequence of a plurality of repetitions, wherein subsequent to the alternating the exposing and the regenerating in the sequence of the plurality of repetitions, the adsorbent material has a sulfur adsorption capacity in the range from 70% to 100% of the sulfur adsorption capacity prior to the regeneration.

2. The method of claim 1, wherein regenerating the adsorbent material comprises:
    exposing the adsorbent material to an oxidizing gas; and
    subsequent to exposing the adsorbent material to the oxidizing gas, exposing the adsorbent material to a reducing gas.

3. The method of claim 1, wherein the oxidizing gas has a second temperature greater than the first temperature.

4. The method of claim 2, wherein the oxidizing gas comprises O₂.

5. The method of claim 4, wherein the oxidizing gas contains approximately 5% O₂ in N₂.

6. The method of claim 2, wherein the reducing gas comprises hydrogen, methane, and/or water.

7. The method of claim 6, wherein the reducing gas contains greater than 0% and less than or equal to 10% hydrogen by volume.

8. The method of claim 6, wherein the reducing gas contains greater than 0% and less than or equal to 90% methane by volume.

9. The method of claim 6, wherein the reducing gas contains greater than 0% and less than or equal to 100% water by volume.

10. The method of claim 2, wherein prior to the regeneration, the adsorbent material has a sulfur adsorption capacity greater than or equal to approximately 2 mmol of sulfur/gram of adsorbent material and less than or equal to approximately 10 mmol of sulfur/gram of adsorbent material.

11. The method of claim 10, wherein subsequent to the regeneration, the adsorbent material has a sulfur adsorption capacity greater than or equal to approximately 1.4 mmol of sulfur/gram of adsorbent material and less than or equal to approximately 10 mmol of sulfur/gram of adsorbent material.

\* \* \* \* \*